United States Patent [19]
Abramson

[11] Patent Number: 6,000,043
[45] Date of Patent: *Dec. 7, 1999

[54] METHOD AND APPARATUS FOR MANAGEMENT OF PERIPHERAL DEVICES COUPLED TO A BUS

[75] Inventor: Darren Abramson, Folsom, Calif.

[73] Assignee: Intel Corporation, Santa Clara, Calif.

[ * ] Notice: This patent is subject to a terminal disclaimer.

[21] Appl. No.: 08/672,872

[22] Filed: Jun. 28, 1996

[51] Int. Cl.⁶ .................................................. G06F 11/273
[52] U.S. Cl. ................................ 714/44; 714/34; 714/56; 710/17; 710/22; 710/110; 710/101
[58] Field of Search ............................. 395/183.2, 183.1, 395/183.08, 282, 290, 185.08, 185.09, 182.2, 182.12, 835, 837, 842, 750.01, 750.03, 281; 364/273.4

[56] References Cited

U.S. PATENT DOCUMENTS

| | | | |
|---|---|---|---|
| 4,086,627 | 4/1978 | Bennett et al. | 364/200 |
| 4,486,826 | 12/1984 | Wolff et al. | 364/200 |
| 4,872,110 | 10/1989 | Smith et al. | 364/200 |
| 4,974,150 | 11/1990 | Long et al. | 364/200 |
| 5,230,043 | 7/1993 | Ichihashi et al. | 395/183.1 |
| 5,357,628 | 10/1994 | Yuen | 395/183.1 |
| 5,450,551 | 9/1995 | Amini et al. | 395/299 |
| 5,499,346 | 3/1996 | Amini et al. | 395/308 |
| 5,528,749 | 6/1996 | Landis et al. | 395/182.21 |
| 5,551,044 | 8/1996 | Shah et al. | 395/750 |
| 5,557,758 | 9/1996 | Bland et al. | 395/308 |
| 5,577,201 | 11/1996 | Chan et al. | 395/185.1 |
| 5,588,112 | 12/1996 | Dearth et al. | 395/182.07 |
| 5,590,377 | 12/1996 | Smith | 395/842 |
| 5,594,882 | 1/1997 | Bell | 395/421.02 |
| 5,598,578 | 1/1997 | Hatta | 395/835 |
| 5,613,126 | 3/1997 | Schmidt | 395/733 |
| 5,619,729 | 4/1997 | Bland et al. | 395/848 |
| 5,630,142 | 5/1997 | Crump et al. | 395/750 |
| 5,630,145 | 5/1997 | Chen | 395/750 |
| 5,630,147 | 5/1997 | Datta et al. | 395/750 |
| 5,631,800 | 5/1997 | Jin et al. | 361/103 |
| 5,637,932 | 6/1997 | Koreeda et al. | 307/125 |
| 5,642,489 | 6/1997 | Bland et al. | 395/308 |
| 5,666,559 | 9/1997 | Wisor et al. | 395/852 |
| 5,802,269 | 9/1998 | Poisner et al. | 395/183.2 |
| 5,875,312 | 2/1999 | Walsh et al. | 395/309 |
| 5,903,906 | 5/1999 | Pettey | 711/118 |

FOREIGN PATENT DOCUMENTS

| | | |
|---|---|---|
| 2 286 910 | 8/1995 | United Kingdom . |
| WO 96/00940 | 1/1996 | WIPO . |

OTHER PUBLICATIONS

Compaq Computer Corporation et al., Distributed DMA Support for PCI Systems, Sep. 1, 1995, Revision 6.0.

Primary Examiner—Robert W. Beausoliel, Jr.
Assistant Examiner—Scott T. Baderman
Attorney, Agent, or Firm—Kenyon & Kenyon

[57] ABSTRACT

A method and apparatus for operating a peripheral system having one or more peripheral devices coupled to at least one bus is described. When a bus master initiates a transaction with a peripheral device that ends in an abort condition (such as a Master Abort condition in a PCI architecture), the bus master generates an interrupt (such as the System Management Interrupt) to a central processing unit (CPU). When the interrupt is received, the CPU then attempts to determine the cause of the abort condition. For example, if the peripheral device is operating in a low power consumption mode, the CPU attempts to power up the device so that a retry of the transaction will be successful. Since the peripheral devices can be kept in a low power consumption mode until accessed by a bus master, the power consumption for the computer system is greatly reduced.

14 Claims, 6 Drawing Sheets

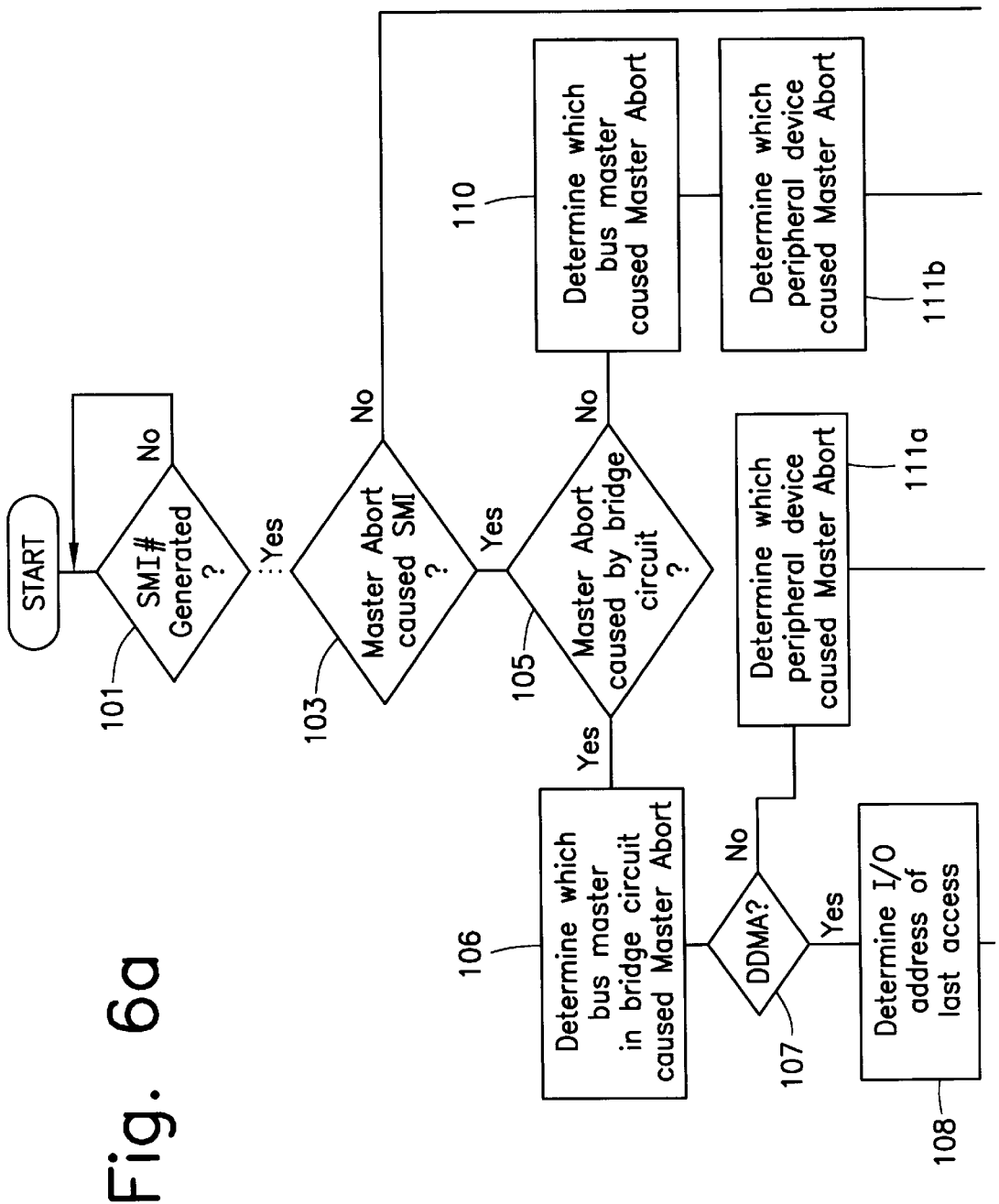

METHOD AND APPARATUS FOR MANAGEMENT OF PERIPHERAL DEVICES COUPLED TO A BUS

BACKGROUND OF THE INVENTION

The present invention pertains to a method and apparatus for managing peripheral devices coupled to a bus, and more particularly, to a method and apparatus for handling abort conditions arising during accesses of peripheral devices in a Peripheral Component Interconnect (PCI) environment.

An example of a system implemented in a Peripheral Component Interconnect (PCI) architecture is shown in FIG. 1. A CPU 1 is coupled to a host bus 3 comprising signal lines for control, address, and data information. A first bridge circuit (also called a host bridge, host-to-PCI bridge, or North bridge circuit) 5 is coupled between the host bus and the PCI bus 7 comprising signal lines for control information and address/data information. The bridge circuit 5 contains cache controller circuitry and main memory controller circuitry to control accesses to cache memory 9 and main memory 11. Data from the main memory 11 can be transferred to/from the data lines of the host bus 3 and the address/data lines of the PCI bus 7 via the bridge circuit 5. A plurality of peripheral devices P1, P2, . . . are coupled to the PCI bus 7 which can be any of a variety of devices such as a SCSI host bus adapter, a LAN adapter, a graphics adapter, an audio peripheral device, etc. A second bridge circuit (also known as a South bridge) 15 is coupled between the PCI bus 7 and an expansion bus 17 such as an ISA or EISA bus. Coupled to the expansion bus are a plurality of peripheral devices such as a bus master 18, an I/O slave 19, and a memory slave 20. A bus master is a device that is capable of initiating a data transfer with another device.

The second bridge 15 typically contains one or more controllers for handling Direct Memory Access (DMA) between the main memory 11 and a peripheral coupled to the expansion bus 17. One such controller is the 82C37A-5 high performance programmable DMA controller manufactured by Intel Corporation of Santa Clara, Calif. A description of the operation of the 8237A controller can be found, for example, at pages 5-4 to 5-21 of the databook "Peripheral Components" ©1995 published by Intel Corporation, the disclosure of which is hereby incorporated by reference in its entirety. Two such 8237 controllers can be coupled together in a known manner to set up seven standard programming model DMA channels for seven devices coupled to the expansion bus 17 or PCI bus 7. As is also known in the art, the DMA controllers handle the I/O "handshaking" signals that exist on the expansion bus 17 and the PCI bus 7 when data is being transferred to/from the main memory 11 (for example) and the peripheral devices coupled to these busses 7, 17 without intervention by the CPU 1. The CPU 1 and the DMA controllers communicate via the control signal lines appearing on the host bus 3 and the PCI bus 7 through bridge 5.

In a typical DMA transfer between a peripheral device and the main memory 11, the CPU 1 first initiates registers in the DMA controller concerning the start address in main memory, the type of transfer (e.g., read or write operation), etc. These registers are assigned to a particular DMA channel, which in turn is assigned to the target peripheral device. Subsequent to the CPU access of the appropriate registers in the DMA controller, a DMA transfer takes place under the control of the DMA controller without further intervention by the CPU.

An enhancement to the DMA system described above is the Distributed Direct Memory Access (DDMA) system. A protocol for implementing DDMA for bus systems such as a PCI bus system has been promulgated by Compaq Computer Corporation and others entitled "Distributed DMA Support for PCI Systems" Revision 6.0, Sep. 1, 1995, the disclosure of which is hereby incorporated by reference in its entirety. In contrast to the DMA system, in a DDMA system, the independent, standard programming model Bus Master channels are distributed among peripheral devices, where these registers normally reside in the DMA controller in the DMA system described above. In other words, the registers associated with individual DMA channels can physically reside outside of the DMA controller in the second bridge circuit 15 and on devices coupled, for example, to the PCI bus 7. The effect is that when the CPU 1 attempts to access a distributed DMA channel, a DDMA Master component (not shown in FIG. 1) translates the PCI I/O reads and writes to the DMA I/O channel into reads and writes to a DMA Slave (e.g., an audio peripheral device). For this DDMA protocol, the DDMA Master component is defined which monitors signals appearing on the PCI bus 7. In a typical DDMA transfer, the CPU 1 continues to access the DMA controller in the second bridge circuit 15. If an access is attempted to a DMA channel that is distributed in some PCI peripheral, the DDMA Master collects or distributes the data before letting the CPU complete its accesses to the DMA channel. The DDMA Master will assert the necessary control signal(s) such that the CPU "thinks" that it is accessing a standard 8237-based design even though those registers are not located with the DMA controller(s).

There are several situations in which a peripheral will not respond during an access by the CPU or another bus master component. These situations include where: 1) the peripheral device is electrically shut off, 2) the peripheral is coupled to an additional PCI bus coupled to the PCI bus 7 and the additional PCI bus is physically detached from the PCI bus 7 (e.g., when a notebook computer is pulled out of a docking station) or the bridge circuit coupling the two busses together is not operating properly, 3) the clock to such an additional PCI bus is shut off, or 4) the peripheral is in a low power mode and is unable to respond. In a DDMA system or otherwise, if the peripheral device will not respond (i.e., it will not claim the transaction by asserting the DEVSEL# signal), the host bridge 5 (or the bus master in question) will perceive a Master Abort on the bus. During such a process the host bridge 5 will deassert the IRDY# signal line and return the bus to an idle state so that it is available for use by another bus master device. In executing a Master Abort, the PCI bus master must set its Master Abort Detected (or Received Master Abort) bit in its configuration status register.

The software that ultimately is seeking the transfer of data to/from the peripheral device may determine that the peripheral device is being accessed even though a Master Abort has occurred which can lead to errors in operation. Also, peripheral devices that are powered down cannot be accessed at all by another device until such time as the peripheral device is powered up. Accordingly, there is a need for a method and apparatus that provides for a peripheral device to be easily powered up so as to participate in PCI I/O without a significant loss of performance. There is also a need for a bus system architecture that provides for lower overall system power consumption. Furthermore, there is a need for a method and apparatus for managing peripheral devices that allows for determining causes for Master Abort errors that occur in a computer system.

SUMMARY OF THE INVENTION

These and other needs are satisfied by the method and apparatus of the present invention. According to the present invention, whenever an abort condition appears on the bus of a computer system (e.g., a Master Abort condition that appears on a PCI bus system), an interrupt (such as a System Management Interrupt (SMI#)) is generated to a central processing unit (CPU). More particularly, after, the bus master perceives the Master Abort condition on the bus, that bus master sets its Received Master Abort (RMA) bit in its configuration registers. Presence of the RMA bit, in turn, causes the generation of the SMI interrupt. In response to the interrupt, the CPU executes code stored in a memory, such as System Management Mode code. During the execution of the code, the CPU identifies the cause of the SMI as a Master Abort, and then seeks to determine which bus master initiated the access and set its RMA bit.

If the bus master is a DDMA Master component, the CPU then identifies, through its own registers, for example, the last I/O address accessed. The CPU then can convert this address to the physical address of the failed peripheral via an address-redirection table in the DDMA Master component. The CPU then executes software to try and determine the cause of the failure for the device. For example, if the controller device for the peripheral has a status register indicating that the device is in a low power consumption mode, the CPU then sends a software command to the controller device to power up the peripheral device and retry the last DDMA transaction.

If the bus master is not a DDMA Master component, the CPU can still look to status registers of devices such as bridge circuits coupled between the bus master and the peripheral device as well as the status of the bus or busses between the two devices. For example, if a note-book computer is removed from its docking station prior to the access to the peripheral device, a bit may be set in the bridge circuit for the docking station indicating that the note-book computer (that may contain the accessed peripheral device) has been removed. Whether the access is a DDMA access or otherwise, the CPU can also interact with the operating system (O/S) software (e.g., to inform the user that a device is not operating properly and give the user options as to how to correct such an error).

DETAILED DESCRIPTION

Figure 1:
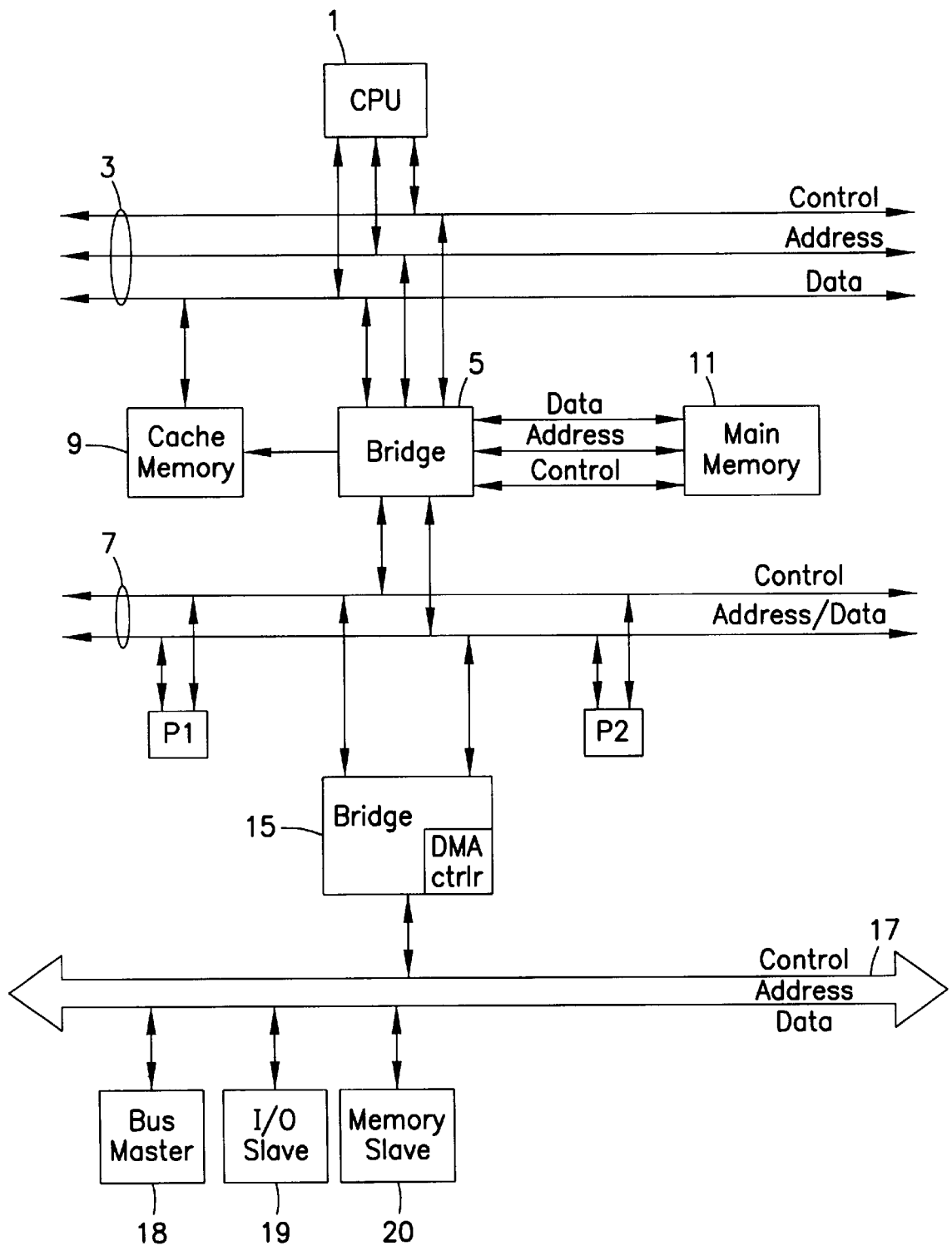
FIG. 1 is a computer system for implementing a Direct Memory Access operation as known in the art.
Figure 2:
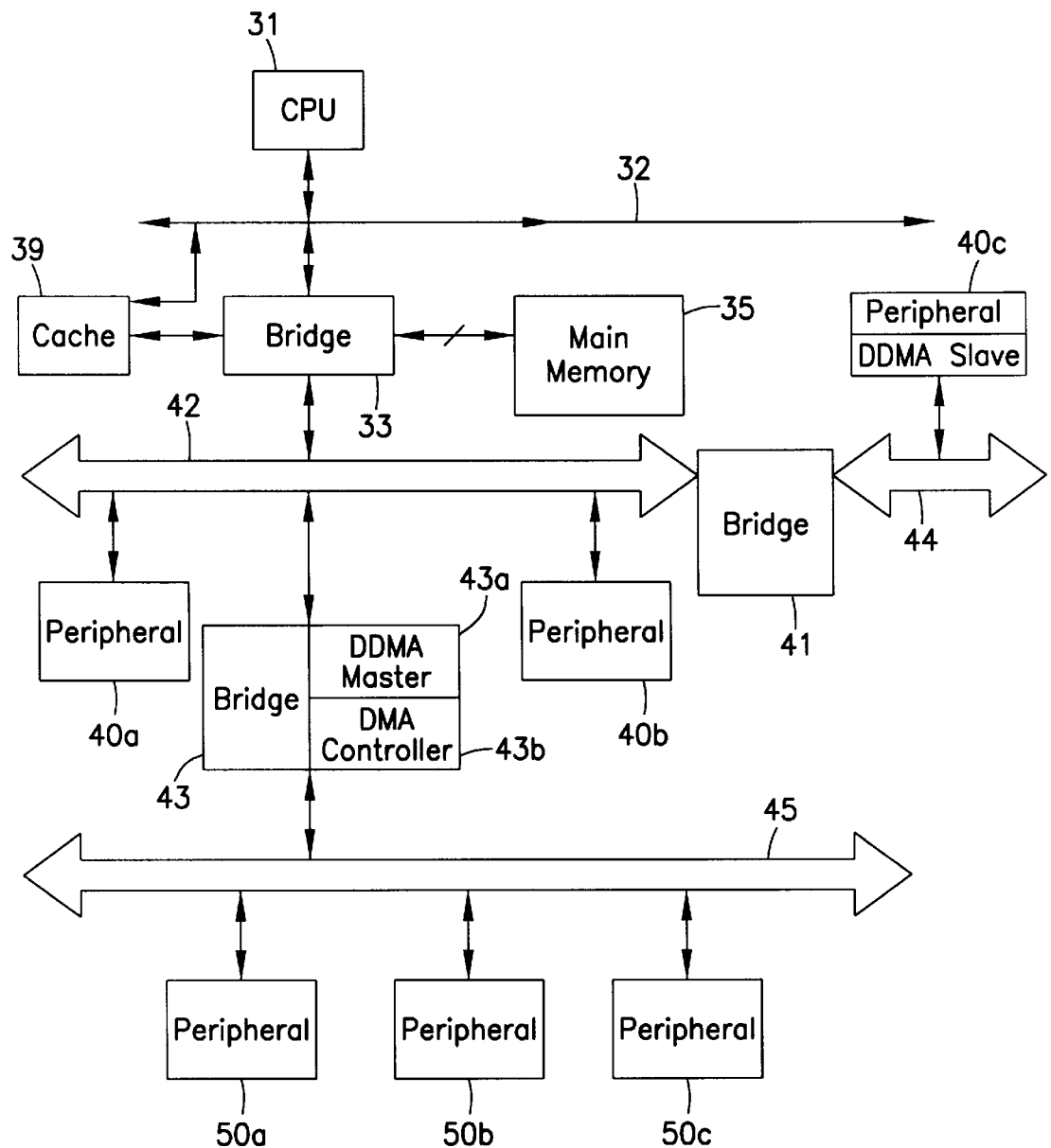
FIG. 2 is a computer system for implementing a Distributed Direct Memory Access operation which incorporates the method and apparatus of the present invention.

An exemplary environment for a DDMA system is shown in FIG. 2. As in FIG. 1, a CPU 31 is coupled to a first bridge circuit 33 via a host bus 32. The first bridge circuit contains a cache controller for controlling cache memory 39 and a main memory controller for controlling main memory 35. The first bridge circuit 33 is coupled between the main memory 35 and the host bus 32 and a bus, such as PCI bus 42, to handle the transfer of data to/from main memory. The first bridge circuit 33 also couples the CPU 31 to the PCI bus 42. Coupled to the PCI bus are a plurality of peripheral components 40a, b. An additional PCI bus 44 is coupled to PCI bus 42 via an additional bridge 41. A further peripheral device 40c is coupled to this additional PCI bus 44. In this embodiment, the further peripheral device includes a DDMA slave component which includes the bus master registers necessary for conducting DMA accesses for its assigned channel as described in the aforementioned DDMA protocol. A second bridge circuit 43 is provided coupled between the PCI bus 42 and an expansion bus 45 to which other peripheral devices 50a–c are coupled. In this embodiment, the second bridge 43 includes the DDMA Master component 43a which operates according to the DDMA protocol mentioned above, and a DMA controller which can be two 8237A DMA controllers connected in series so as to provide seven DMA channels.

In a write operation to initialize DDMA control registers, the CPU 31 attempts to access a DMA channel via the DMA controller 43b of the second bridge circuit 43 by writing to a channel address. In this example, the CPU 31 is attempting to initiate DMA registers to configure DMA channel 0. A register in the DDMA Master 43a of the second bridge circuit 43 stores an indication of whether channel 0 is a distributed DMA channel or not (seven channels are provided with channel 4 being reserved for cascading two 8237 controllers having four channels each). One skilled in the art will appreciate that a DDMA transfer can also occur with peripheral devices coupled to the PCI bus 42 (e.g., peripheral devices 40a, b), for example. Since the peripheral corresponding to channel 0 is distributed, the attempt by the CPU to initiate the registers for channel 0 in the DMA controller 43b would not be successful. Accordingly, when the CPU 31 initiates the write operation (i.e., a PCI I/O cycle) on the PCI bus 42 via the bridge circuit 33, the DDMA Master 43a responds to the PCI I/O cycle by driving the control signal DEVSEL# active (via the second bridge circuit 43). The DDMA Master 43a issues a PCI retry to terminate this particular I/O cycle and also asserts a PCI request signal (e.g., asserting a signal on a PCI REQ pin) to request use of the PCI bus 42. A PCI retry is the assertion of the STOP# signal while keeping the TRDY# signal deasserted and keeping the DEVSEL# signal asserted (all standard PCI signals). This informs the CPU (via the bridge circuit 33) that the target (i.e., the DDMA Master acting on behalf of the peripheral device 40c) does not intend to transfer the current initialization data and the CPU must stop the current transaction and retry the same transaction at a later time. The first bridge circuit 33 will deassert its PCI request on behalf of the CPU 31.

When the DDMA Master 43a, in response to its PCI request signal, is granted the PCI bus by arbitration circuitry, it performs one or more write cycles to the peripheral 40c (when the peripheral claims the transaction by asserting the DEVSEL# signal on the bus) to send the appropriate channel initialization information for the DMA transaction (e.g., starting base address, word count, etc.). The DDMA Master 43a knows the proper address for accessing the peripheral 40c and uses the data obtained during the original write cycle of the CPU 31 to determine the proper values to write to the peripheral 40c and to the DMA controller 43b. The DDMA Master will then deassert the PCI REQ signal line and wait for the CPU to attempt the retry of the write operation. Meanwhile, the peripheral device 40c will claim the PCI I/O cycle and complete the transfer of the initialization data to the peripheral device 40c in accordance with the original CPU write operation. When the CPU retries the cycle, the DDMA Master 43a simply completes the I/O cycle because the initialization data has already been written to the DMA registers in the peripheral device 40c. Once the initialization data has been written to the peripheral device 40c, the peripheral is then "enabled" and the DMA transfer then takes places. During the DMA transfer, the CPU 31 can obtain status information or the like during the DMA transfer via the bridge circuit 33.

A read operation is similar to the write operation. Once again, the DDMA Master 43a recognizes when the CPU 31 is attempting to read status information/data from the DMA controller 43b (via the bridge circuit 33). Assuming that the peripheral device 40c is distributed, the DDMA Master 43a asserts DEVSEL#, issues a PCI retry to the CPU 31, and issues a PCI REQ signal. When the DDMA Master gains access to the PCI bus 42, it reads the individual channel read information from the peripheral device 40c. When the CPU 31 executes the retry of the read operation, the DDMA Master returns the individual channel read information and the I/O configuration read operation is executed. As seen above, it is the role of the DDMA Master device to translate I/O cycles to/from the standard DMA controllers into I/O cycles to/from distributed DMA slave channels.

Figure 3:
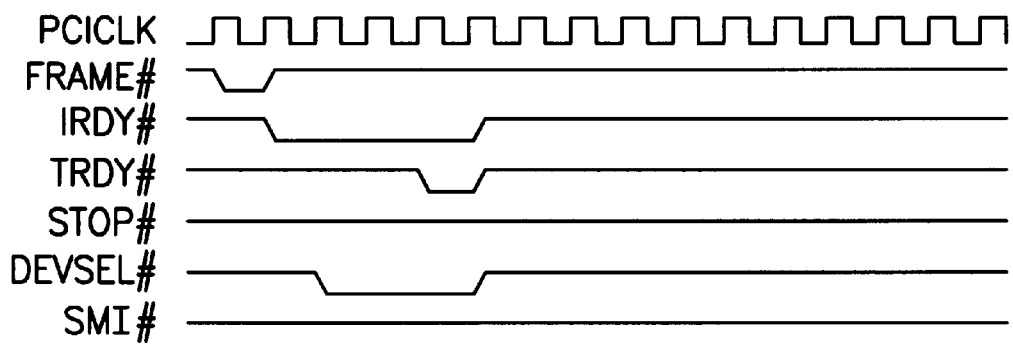
FIG. 3 shows a timing diagram of a standard I/O cycle on a PCI bus.

The DDMA operation described above is a specific example of a transaction over a bus, such as the PCI bus. One skilled in the art will appreciate that other types of transactions can occur on a PCI bus other than DDMA. All transactions can be characterized by an address phase and one or more data phases. Referring to FIG. 3, a bus master (also referred to as an initiator) asserts the FRAME# signal for one or more PCICLK (PCI Clock) cycles, and places the start address for a target on the address/data signal lines and the transaction type on the command signal lines of the PCI bus 42 (FIG. 2). Each target device will latch the address and one target device (e.g., peripheral device 40b) will recognize that the address identifies a start address within its assigned range. The duration of the FRAME# signal indicates the duration of the transaction from the beginning of the address phase to a point where the bus master is ready to complete the final data phase.

During the data phase, the bus master asserts the IRDY# signal (initiator ready) indicating that valid data is on the data bus (during a write operation) or that the bus master is ready to accept data from the target device (during a read operation). At some point the target asserts the DEVSEL# after it has decoded the start address sent to it by the bus master during the address phase. The target device also asserts the TRDY# signal when it is ready to complete the current data phase. Thus, assertion of this signal indicates that, during a write operation, the target is ready to accept data from the bus master, and during a read operation, the target has placed valid data onto the PCI bus. On the rising edge of the PCICLK, the IRDY#, TRDY# and DEVSEL# signals are deasserted indicating the end of the last data phase.

Figure 4:
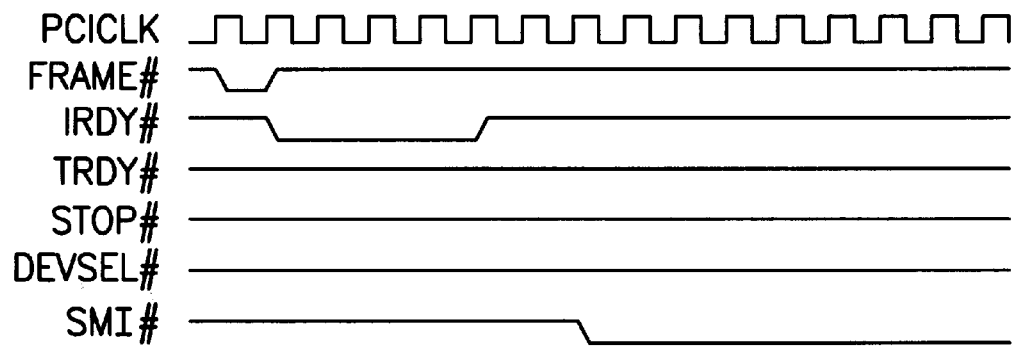
FIG. 4 shows a timing diagram of the creation of a Master Abort condition on a PCI bus and the generation of an SMI# interrupt according to the present invention.

In a DDMA system or otherwise, if the peripheral target device will not respond (i.e., it will not claim the transaction by failing to assert the DEVSEL# signal), the bridge circuit 33 (or the bus master in question) will perform an abort, such as a Master Abort in a PCI architecture. During such a process the bridge circuit 33 will deassert the IRDY# signal line and return the bus to an idle state so that it is available for use by another bus master device. Referring to FIG. 4, the timing diagram for the situation where the target fails to claim the transaction is shown. In executing a Master Abort, the bus master must set its Master Abort Detected (or Received Master Abort) bit in its configuration status register.

Figure 5:
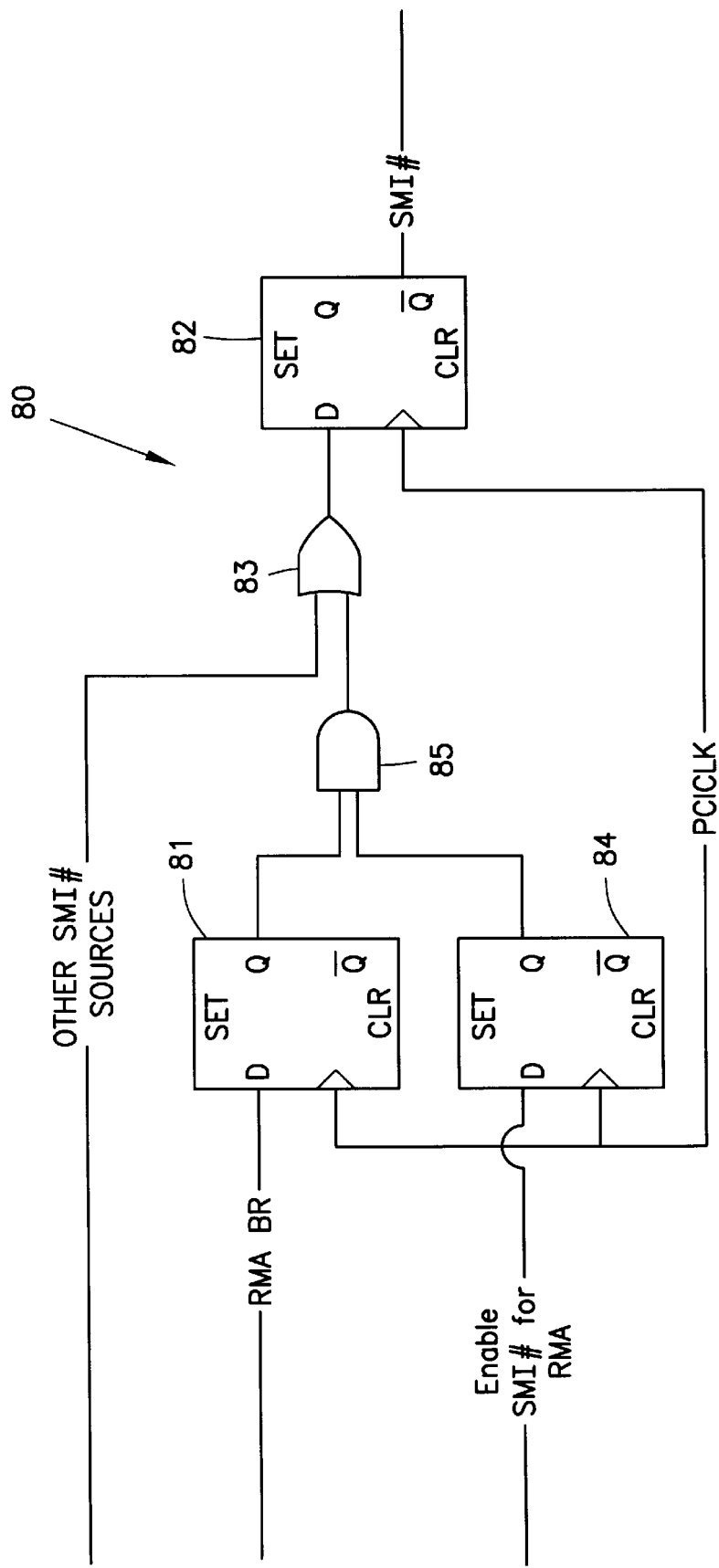
FIG. 5 depicts SMI# interrupt generation circuitry constructed according to the present invention.

Pursuant to a feature of the present invention as shown in FIG. 5, detection of a Master Abort condition on the bus causes an SMI# interrupt to be generated by SMI Generation circuitry 80 located at the bus master. The RMA bit of the PCI configuration register is supplied as an RMA signal to the D input of a first D-type flip-flop 81. When the RMA bit is set or asserted (in response to a Master Abort condition), the non-inverted output of the first flip-flop 81 will be set to a "1" value under control of the PCICLK input. The non-inverted output of the first flip-flop is then supplied to a second D-type flip-flop 82. When the output of the first flip-flop 81 is set to a "1," the SMI# signal is generated onto the PCI bus by the second flip-flop 82 (i.e., the inverted output of the second flip-flop) under the control of the PCICLK.

To integrate the circuitry with existing circuitry for generating an SMI# interrupt in the bus master, an OR gate 83 is provided having its first input coupled to the output of the first flip-flop 81 and its other input(s) coupled to one or more additional SMI# sources. Examples of additional SMI# sources include the expiration of a Fast Off timer (indicating that the bus master has not been used for a long period of time) and various software events using Advanced Power Management registers in the bus master (e.g., APMC and APMS registers) as described in the data book "Peripheral Components" ©1995 by Intel Corporation, Santa Clara, Calif. Also, to allow for enabling/disabling the SMI# generation based on the setting of the RMA bit, a third D-type flip-flop 84 and an AND gate 85 are added. The enabling signal is supplied to the D input of the third flip-flop 84. Under control of the PCICLK signal, the first and third flip-flops 81, 84 generate outputs to the inputs of the AND gate 85. The output of the AND gate is coupled to the first input of the OR gate 83. Accordingly, a "1" value will not be provided to the D input of the second flip-flop 82 or the first input of the OR gate 83 unless a "1" value is provided as an enable signal to the D input of the third flip-flop 84 (i.e., unless the enabling signal is asserted).

The SMI# interrupt, when generated can be sent directly the SMI# input of the CPU 31. Upon receipt of the SMI# interrupt, the CPU 31 latches the interrupt internally, and when the SMI# interrupt is recognized on an instruction boundary, the CPU 31 will execute code, such as System Management Mode (SMM) code and assert its SMIACT# signal.

Figure 6B:
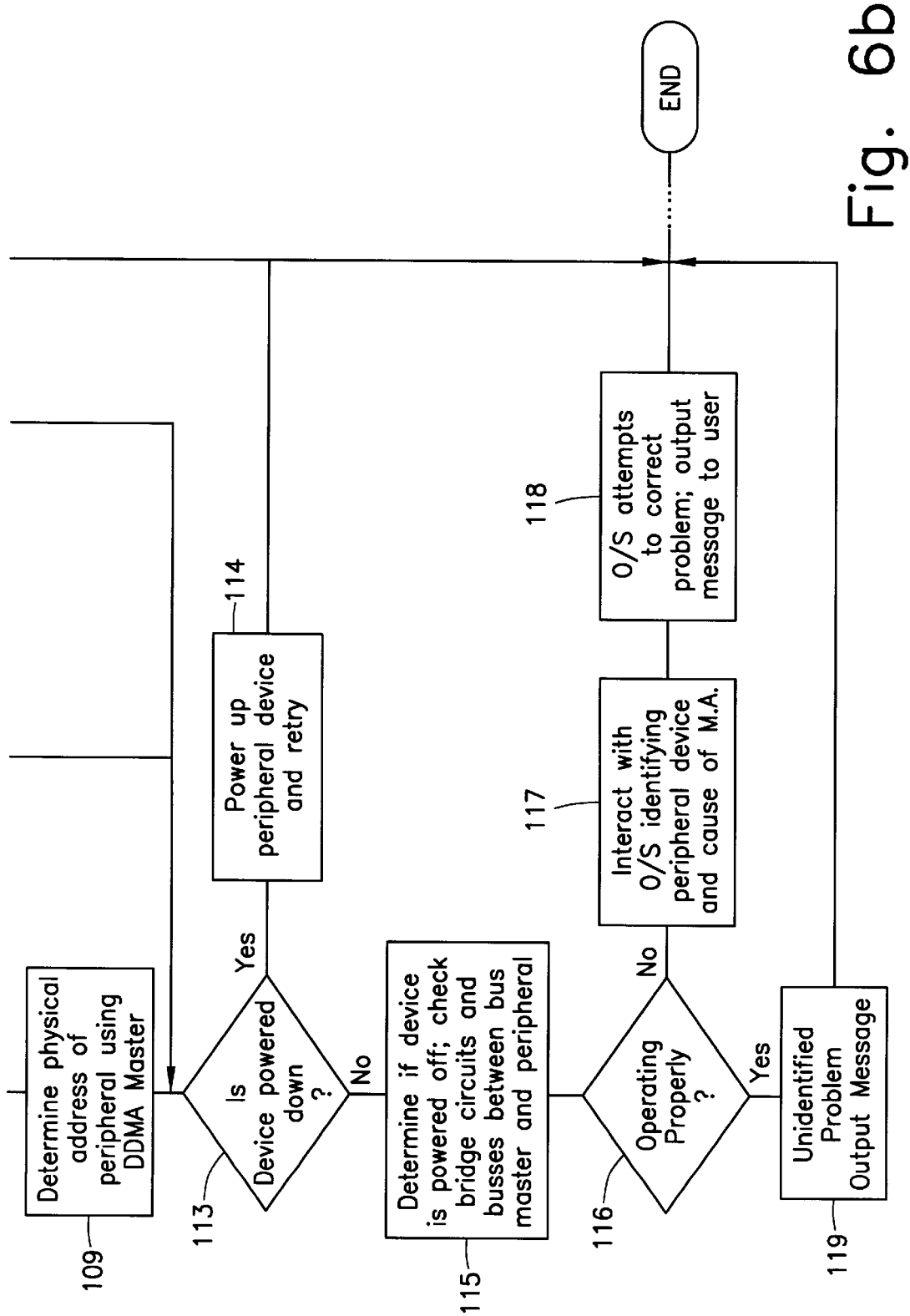
FIG. 6 is a flow diagram of the operation of System Management Mode code according to the present invention.

During System Management Mode, the CPU 31 executes code out of System Management Random Access Memory (SMRAM) which can be part of the main memory 35. An example of the SMM code can be found in most motherboards and is typically provided by the Original Equipment Manufacturer (OEM). Referring to FIG. 6, the SMM code is altered somewhat according to the present invention to include further features commensurate with the generation of the SMI# interrupt. In decision block 101, the operation of the code first checks to see if an SMI# interrupt has been generated. Subsequent to the detection of the SMI# interrupt, the operation of the SMM code determines at decision block 103 whether a Master Abort caused the SMI# interrupt. If a Master Abort has occurred, the operation of the SMM code then determines in block 105 whether a bus master in the bridge circuit 43 caused the Master Abort which can be determined from the configuration registers in the respective bus masters.

If the Master Abort occurred in the bridge circuit 43 (which includes the DDMA Master component 43a and the DMA controller 43b in this embodiment), control passes to decision block 106 to determine which bus master in the bridge circuit initiated the transaction that ended in a Master Abort (i.e., which bus master set its RMA bit). If the bus master was the DDMA Master component 43b (decision block 107) control passes to block 108 where the operation of the code looks to memory, the registers in the CPU, or the like to determine the I/O address that was last sought for a DDMA transfer. Based on this I/O address, an address/redirection table in the DDMA Master component 43a is accessed in block 109 to determine the physical address for the peripheral device that corresponds with the DMA channel referred to by the I/O address. Though, in this embodiment the DDMA Master component 43a and DMA controller 43b reside in bridge circuit 43, these devices can be coupled to the bus 42 in other locations, as well. Preferably, however, the DDMA Master component 43a and DMA controller 43b should be located at the same location as the logic used in generating the SMI# interrupt.

As an example, peripheral device 40b can be a PCI-based audio device implemented using the DDMA protocol. As described above, a write operation to the peripheral device 40b is handled by the DDMA Master component 43a and the DMA controller 43b. The CPU 31 accesses the peripheral device 40b using the I/O address corresponding to its DDMA channel. Accordingly, the DDMA Master, which has stored the physical address of the peripheral, converts this I/O cycle into an I/O cycle with the peripheral device 40b. If, for example, the audio device 40b is operating in a low power mode (e.g., after power management software signals the controller of the audio device to power down the audio device by disconnecting it from a power supply), then the access by the DDMA Master component 43a will end in a Master Abort condition (see FIG. 4) and an SMI# interrupt will be generated, as described above. Thus, returning to FIG. 6, the DDMA Master component 43a will have the physical address of the peripheral device 40b, and once the CPU has determined that the DDMA Master initiated the transfer that ended in a Master Abort, the CPU 31 can determine the physical address of peripheral device 40b via information stored in the DDMA Master 43a.

Referring back to decision block 105, if the Master Abort did not occur in the bridge circuit 43, the operation of the code then turns to block 110 where a snooping operation is performed to determine which bus master received the Master Abort. Control then passes to block 111b where the operation of the code attempts to determine which peripheral device failed to respond to the bus master initiated transaction. Likewise, if the bus master was not the DDMA Master component, the operation of the code passes to block 111a to determine which peripheral device failed to respond to the identified bus master's initiated transaction.

The operation of the code then attempts to determine what caused the Master Abort in the peripheral device by first determining if the accessed peripheral device is powered down in decision block 113. If the peripheral device is powered down (i.e., operating in a low power consumption mode), then the device is caused to power up in block 114 (e.g., by issuing a proper command to the controller device which controls the powered-down peripheral device). Subsequently, and as a last step, the code attempts to force a retry of the transaction that ended in a Master Abort since the device is now powered up and ready for the transaction. If it is not determined that the accessed peripheral device is in a low power mode, control passes to block 115 where it is determined whether the peripheral device is electrically shut off; if any required bridge circuits(s) (e.g., bridge circuit 41 in FIG. 2) between the peripheral device and the bus master is(are) operating correctly; or if the circuit is complete between the bus master and the peripheral device (including whether the clocking signal is being supplied to an additional bus). For example, when a note-book computer is removed from a docking station, appropriate registers will be set to indicate a broken connection between the bus master and peripheral device. If these conditions are true and the peripheral device failed to claim the transaction, then either the pointer in the DDMA table is incorrect, or the peripheral itself is broken. Control then passes to block 119, where a message is output to the user to indicate that the access to the device failed. If the CPU identifies the cause of the Master Abort condition (decision block 116), control passes to blocks 117 and 118 where the operation of the SMM code interacts with the Operating System (O/S) by passing the information as to cause and improperly operating peripheral device. The operation of the O/S system then attempts to correct the problem by itself or with the assistance of the user (by outputting a message to the user). If the SMI# interrupt was generated for some reason other than a Master Abort condition or a failed access of a peripheral using the DDMA Master, the SMM code continues to operate as before (e.g., disable the SMI# interrupt, clear the source of the SMI# interrupt, enable the generation of a new SMI# interrupt from another source, etc.).

Using the method and apparatus of the present invention, peripherals need not recognize PCI I/O cycles on the bus, and therefore, these devices can be powered down to reduce power consumption. Thus, the method and apparatus of the present invention achieve a great savings in overall system power consumption. The Master Abort can be used to indicate that the peripheral device has been placed in a low power consumption mode and an SMI# interrupt can be generated at that time to power up the peripheral device. Also, a bus master on the PCI bus, such as the DDMA controller, generates an SMI# interrupt generated each time a Master Abort condition appears on the bus, allowing the CPU to take actions to correct the problem or assist in its correction. Other bus master devices that make up a part of the motherboard and are coupled to the PCI bus can generate an SMI# interrupt in the same situation (preferably by sending a sideband signal to the DDMA Master component which, in turn, generates the SMI# interrupt). Since a peripheral device does not need to recognize PCI I/O cycles on the bus while operating in a low power consumption mode, additional hardware at the peripheral device to recognize when it is being accessed is not needed.

What is claimed is:

1. A method of operating a computer system, comprising a central processing unit, a bus master component, a peripheral device coupled together by at least one bus, when the peripheral device fails to respond to a transaction on the bus initiated by the bus master component, the method comprising:

generating an abort condition on the bus, when said peripheral fails to respond, said peripheral device fails to respond because said peripheral device is operating in a low power consumption mode;

generating an interrupt to said central processing unit in response to said abort condition; and executing code in said central processing unit to determine the cause of the failure of said peripheral device to respond to said bus master component and to cause said peripheral device to be powered up.

2. The method of claim 1, further comprising:

retrying said transaction after said peripheral device is powered up.

3. The method of claim 2, wherein said bus operates according to a Peripheral Component Interconnect (PCI) architecture, said abort condition is a Master Abort condition, said interrupt is a System Management Interrupt (SMI), and said code is System Management Mode (SMM) code.

4. The method of claim 2 wherein said bus master component is a Distributed Direct Memory Access (DDMA) Master component and said transaction is a DDMA transaction with said peripheral device.

5. The method of claim 4, wherein said bus operates according to a Peripheral Component Interconnect (PCI) architecture, said interrupt is a System Management Interrupt (SMI), and said additional code is System Management Mode (SWM) code.

6. The method of claim 5, wherein during said executing step, said central processing unit determines a physical address for said peripheral device via said DDMA Master component.

7. A method of operating a computer system, comprising a central processing unit, bus master component, and a peripheral device coupled together by at least one bus, when the peripheral device fails to respond to a transaction initiated by said bus master because the peripheral is operating in a low power consumption mode, the method comprising:

generating an abort condition on the bus, when said peripheral fails to respond;

generating an interrupt to said central processing unit in response to said abort condition;

detecting said failure to respond by said central processing unit; and powering up said peripheral device by said central processing unit.

8. The method of claim 7 wherein said bus master component is a Distributed Direct Memory Access (DDMA) Master component and said transaction is a DDMA transaction with said peripheral device.

9. The method of claim 8, wherein during said detecting step, said central processing unit determines a physical address for said peripheral device via said DDMA Master component.

10. A computer system comprising:

a central processing unit;

a peripheral device coupled to said central processing unit via at least one bus;

a bus master component coupled to said bus and initiating a transaction over said at least one bus to said peripheral device, such that when said peripheral device fails to respond to a transaction directed to said peripheral device by said bus master component an abort condition is generated on the bus and said bus master component generates an interrupt to said central processing unit in response to said abort condition, said peripheral device fails to respond because said peripheral device is operating in a low power consumption mode; and said central processing unit is programmed to operate such that when said interrupt is received, said central processing unit determines the cause of the failure of said peripheral device to respond to said bus master component and said central processing unit is programmed to cause said peripheral device to be powered up.

11. The system of claim 10 where said bus operates according to a Peripheral Component Interconnect (PCI) architecture, said abort is a Master Abort condition, said interrupt is a System Management Interrupt (SMI), and said central processing unit is programmed with System Management Mode (SMM) code.

12. A computer system comprising:

a central processing unit;

a peripheral device coupled to said central processing unit via at least one bus wherein said bus operates according to a Peripheral Component Interconnect (PCI) architecture, a bus master component coupled to said bus and initiating a transaction over said at least one bus to said peripheral device, such that when said peripheral device fails to respond to a transaction directed to said peripheral device by said bus master component an abort condition is generated on the bus and said bus master component generates an interrupt to said central processing unit in response to said abort condition, said abort is a Master Abort condition, said central processing unit is programmed to operate such that when said interrupt is received, said central processing unit determines the cause of the failure of said peripheral device to respond to said bus master component said interrupt is a System Management Interrupt (SMI), and said code is System Management Mode (SMM) code and wherein said bus master component includes an SMI generation circuit including a flip-flop having an input adapted to be coupled to a Received Master Abort (RMA) signal in said bus master and an output supplying said SMI interrupt wherein said RMA signal is asserted.

13. The system of claim 12 wherein said SMI generation circuit further includes a second flip-flop having an input adapted to be coupled to the output of said first flip-flop and an output supplying said SMI interrupt.

14. The system of claim 13 wherein said SMI generation circuit further includes:

an AND gate having a first input coupled to the output of said first flip-flop and an output coupled to the input of said second flip-flop; and a third flip-flop having an input adapted to receive an enabling signal and an output coupled to a second input of said AND gate, such that said SMI interrupt is generated only when said RMA signal and said enabling signal are asserted.

* * * * *

UNITED STATES PATENT AND TRADEMARK OFFICE
CERTIFICATE OF CORRECTION

PATENT NO. : 6,000,043
DATED : DECEMBER 7, 1999
INVENTOR(S) : DARREN ABRAMSON

It is certified that error appears in the above-indentified patent and that said Letters Patent is hereby corrected as shown below:

| | |
|---|---|
| Column 3, line 5 | "after," should be --after-- |
| Column 5, line 7 | "places" should be --place-- |
| Column 9, line 15 | "(SWM)" should be --(SMM)-- |

Signed and Sealed this

Tenth Day of April, 2001

*Attest:*

NICHOLAS P. GODICI

*Attesting Officer*     *Acting Director of the United States Patent and Trademark Office*